United States Patent [19]

Tchernev

[11] Patent Number: 4,637,218
[45] Date of Patent: Jan. 20, 1987

[54] HEAT PUMP ENERGIZED BY LOW-GRADE HEAT SOURCE

[76] Inventor: Dimiter I. Tchernev, 9 Woodman Rd., Chestnut Hill, Mass. 02167

[21] Appl. No.: 801,491

[22] Filed: Nov. 18, 1985

Related U.S. Application Data

[60] Continuation of Ser. No. 605,812, May 1, 1984, abandoned, which is a continuation-in-part of Ser. No. 11,689, Feb. 12, 1979, Pat. No. 4,584,842, which is a continuation-in-part of Ser. No. 710,609, Aug. 2, 1976, Pat. No. 4,138,850, which is a division of Ser. No. 520,808, Nov. 4, 1974, Pat. No. 4,034,569.

[51] Int. Cl.⁴ .............................................. F25B 17/00
[52] U.S. Cl. .................................... 62/106; 62/235.1; 62/476; 62/480; 62/490
[58] Field of Search ..................... 62/106, 235.1, 476, 62/480, 490; 126/428

[56] References Cited

U.S. PATENT DOCUMENTS

| | | | |
|---|---|---|---|
| 1,833,901 | 12/1931 | Hull | 62/490 X |
| 4,121,428 | 10/1978 | Glenn | 62/235.1 |
| 4,138,850 | 2/1979 | Tchernev | 62/235.1 X |
| 4,165,952 | 8/1979 | Bennett | 62/235.1 X |
| 4,183,227 | 1/1980 | Bouvin, Sr. et al. | 62/480 |
| 4,187,688 | 2/1980 | Berg | 62/235.1 |
| 4,231,772 | 11/1980 | Berg | 126/428 X |

*Primary Examiner*—Lloyd L. King
*Attorney, Agent, or Firm*—Penrose Lucas Albright

[57] ABSTRACT

A heat pump using zeolite as an adsorbent wherein thermal energy from adsorbing zeolite in a one hermetically sealed space is used to heat desorbing zeolite located in another hermetically sealed space, such heat being conveyed by heat exchanger conduits containing a fluid which, before heating the desorbing zeolite, has its temperature increased to about 400° F. by a gas flame, the adsorption and desorption phases being changed between the zeolites in each cycle by reversing the fluid flow in the conduits. Cooling and heating for a building or other purposes are provided through the condenser and evaporator respectively for the working gas (water) which is desorbed and adsorbed into the zeolites. A propagating temperature front is established through the fluid-to-zeolite heat exchanger conduits to provide utilization of as much as ninety percent of thermal energy available during the desorption/adsorption phases.

43 Claims, 20 Drawing Figures

Simplified Concept of Zeolite Cycle

Fig. 4

Typical Isotherms for Zeolite & Water Vapor

Equilibrium $H_2O$ Loading:
Lb. of adsorbed $H_2O$
100 lb. of activated Linde molecular sieve type 13X
Activation conditions
350°C and <10 Microns Hg

Fig. 5

Anticipated Temperature-Time Profile of Conventional Zeolite Heat Exchanger

Fig. 6

Anticipated Temperature-Time Profile of New Zeolite Heat Exchanger

Zeolite Cycle

Fig. 15

Heat Exchanger Length

Liquid Fluid ———
Gaseous Fluid ---------

Gas/Fluid flow

Fig. 19

Gas/Fluid flow

HEAT PUMP ENERGIZED BY LOW-GRADE HEAT SOURCE

RELATED APPLICATIONS

This application is a continuation of application Ser. No. 605,812 filed May 1, 1984, now abandoned, which is a continuation-in-part of Ser. No. 11,689 filed Feb. 12, 1979, now U.S. Pat. No. 4,584,842, which is a continuation-in-part of application Ser. No. 710,609 filed Aug. 2, 1976, U.S. Pat. No. 4,138,850 of Feb. 13, 1979, which is a divisional application of application Ser. No. 520,808, filed Nov. 4, 1974, U.S. Pat. No. 4,034,569 of July 12, 1977.

BACKGROUND OF THE INVENTION

This invention relates to a novel heat pump system which uses low-grade energy sources such as provided by air heated by the combustion of gas, oil, exhaust gases, geothermal fluids, waste gases and solar energy which is capable of providing space heating and cooling requirements of a building.

For over forty years, residential and small commercial buildings have been cooled almost exclusively by electrically driven compressor air conditioning units. The primary reasons for this are: (1) the relatively low initial cost of the equipment; (2) a high coefficient of performance, usually two to three, which, together, with dependability and long equipment lifetime provides low operating costs; and (3) the use of aircooled condensers and evaporators which reduces the system's complexity and costs. The coefficient of performance (COP) equals refrigeration effect (Q) divided by net work input (W). This may be expressed as $COP = 778Q/W$ where "Q" is the heat in BTUs absorbed by the unit per pound refrigerant and "W" is the work in foot pounds supplied to unit, in this case its compressor.

Existing gas-fired cooling systems generally have on the other hand: (1) a low coefficient of performance, usually less than 0.7 and therefore relatively high operating costs; (2) the need for a cooling tower to serve for the purposes of the condenser which therefore increases initial and operating cost of the system; and (3) the requirement to use corrosive substances such as ammonia or lithium bromide solutions that reduce equipment lifetime and increase maintenance and operating costs.

As a result, whereas the residential market for gas is substantial in the winter and when heating is otherwise required, it is not significant in the cooing season. This contributes to poor utilization of distribution and storage capacities of the gas and liquid fuel industries as well as for the electric utilities.

With the introduction of electrically driven heat pumps which have a coefficient of performance of three to four and are capable of both heating and cooling, it can be anticipated that the efficient distribution of gas and liquid fuel from producer to consumer will be further eroded. If this is not to occur, a gas-energized cooling system must be provided which is realistically competitive with conventional existing air-conditioning systems for relatively small buildings. If such system is to comprise a gas-fired heat pump, it must have a coefficient of performance reasonably competitive with that of the electrically driven heat pump and otherwise be competitive which means that it have the same low initial equipment costs, long equipment lifetime and dependability of conventional heating and cooling systems, or better.

The coefficient of performance of gas fired cooling systems may be increased by providing two-stage absorption systems. Unfortunately, due to the complexity of such systems including the need for a cooling tower, the initial investment and operating and maintenance requirements are not as a practical matter compatible with residential and small building heating and cooling needs.

The principle of energy recycling is old and has been used in practical applications since at least the 1920's. The device employed for this purpose is usually called a regenerator and is used extensively with gas turbines in large power plants. The regenerator may be a rotor having cylindrical packing through which hot and cold gases pass simultaneously. Heat temporarily stored in such packing from the hot gas is physically moved into the cold gas stream by steadily rotating the cylindrical body which contains a checkerwork for the storage of thermal energy. A fixed two-bed regenerator system may also be used. This comprises two containers wherein reversals in the fixed bed system are effected by the closing and opening of relevant valves, shutting off the hot/cold gas and allowing the start of the flow of the cold/hot gas through the packing. With the two-bed regenerator system, one of the regenerators is, at any instant, preheating the cold gas. Regenerators are common in glass making furnaces where they must be able to withstand entrance gas temperatures on the order of 1600° C. The state of the art on existing commercial devices used for the recycling of energy may be found in "Thermal Energy Storage and Regeneration" by Schmidt and Willmott, published in 1981 by Hemisphere Publishing Corporation, McGraw-Hill. Attention is also invited to U.S. Pat. No. 4,183,227 issued Jan. 15, 1980 of J. Bouvin et al.

SUMMARY OF THE INVENTION

The instant invention is a heat pump, preferably gas fired, which has a cooling coefficient of performance of at least one and possibly as high as two and a heating coefficient of performance of two or more, depending on the specific cooling and heating requirements and available energy, such coefficient approaching the system's Carnot efficiency which, in terms of the coefficient of performance, is three to four. This is an increase of two to three times the presently obtainable values with single-stage adsorptions or absorption systems and approaches the efficiency of electrically driven heat pump which are burdened by significantly higher power costs.

The heat pump of the instant invention is, moreover, simple in design and has a relatively low initial cost and long lifetime with little or no maintenance.

Of course, an increased coefficient of performance can be obtained with two-stage adsorption systems. But, as indicated above, the complexity of the system is increased considerably and the need for a cooling tower is not eliminated. Accordingly, two-stage systems are not suitable for relatively small installations due to their substantially greater initial equipment costs as well as their operating and maintenance costs.

Prior concepts of the inventor wherein zeolite is utilized as an adsorbent are disclosed in U.S. Pat. Nos. 4,034,569 of July 12, 1977, 4,138,850 of Feb. 13, 1979 and copending application Ser. No. 11,689 filed Feb. 12, 1979. Such disclosures are incorporated herein by reference.

Although, like the inventor's prior concepts, the invention herein utilizes zeolite as an adsorbent for the refrigerant gas, prior emphasis has been on cooling whereas the instant concept is directed more specifically to a heat pump which provides both heating and cooling and has two energy conversion units wherein one unit can be desorbing while the other unit is adsorbing, the thermal energy from the adsorbing zeolite being used to heat the desorbing zeolite. In addition, the invention involves the propagation of a temperature front through the metal-zeolite heat exchanger. This permits reuse of as much as ninety percent of the thermal energy available during the sorption processes. By the use of zeolite as the adsorbent, two energy converters with heat exchange and the propagating temperature front through the heat exchanger, the coefficient of performance obtained by the apparatus and process approaches the theoretical Carnot efficiency of three to four. In other words, the gas-fired zeolite heat pump of the instant invention is substantially as efficient as an electrical heat pump having, however, the further advantage of a markedly reduced operating costs.

Although natural gas or oil or any gaseous or liquid fuel which produces hot gases of combustion may be used for the system, it also may employ the waste heat generated by an internal combustion engine or any other source of hot gas or liquid which provides a temperature in the range of 250° to 400° F. For example, there are various types of solar collectors which can generate temperatures up to 600° F. There is also a need in various manufacturing and process plants to dissipate waste heat which can also be used as the heat-energy source required for the instant invention. As a general proposition, any fluid source at temperatures higher than those required can be thermally diluted through a number of mechanisms by a further fluid having a cooler temperature and this may or may not involve intermixing of fluids. With natural gas or oil, the ultimate temperature is, in fact, lowered by direct intermixing of outside air with the gases of combustion to provide the fluid temperature desired. Accordingly, although the ultimate heat source may not be "low-grade", by the intermixing of other fluids, it is converted into the equivalent of a low-grade heat source. For the purposes of this application, a low-grade heat source is considered any heat source reasonably compatible with the system wherein an effective heat differential can be provided, the maximum requisite differential being roughly less than 200° C. or 360° F.

The preferred adsorbent is zeolite which may be natural or artificial although the natural zeolites are preferred. Operable natural zeolites include chabazite, clinoptilolite, mordenite, erionite and others. A synthetic zeolite manufactured by Union Carbide is known as Linde molecular sieve type 13X.

The publication "Natural Zeolites, Occurrence, Properties, Use" edited by L. B. Sand and F. A. Mumpton, Peragamon Press, provides considerable information on various types of natural zeolites. Zeolites are molecular sieves because in their dehydrated state, crystals are interlaced with regularly spaced channels of molecular dimensions. This network of uniform pores comprises almost fifty percent of the total volume in the crystals. Empty cavities of molecular sieves have a strong tendency to recapture water molecules which have been driven off. The interaction of the dipole or quadrupole moment of gas molecules with the non-uniform electric fields generated in the zeolite crystals structure, that is the cavities and interconnecting tunnels on an atomic scale, is strong and nonlinear.

The inventive concepts disclosed herein involve at least two energy converters which are contained in respective separate sealed containers so that when the heat pump is energized one of the energy converters or containers is always in the desorption part of the cycle. By using two separate zeolite containers, a significant exchange of thermal energy from the container being cooled which is in the adsorption part of the cycle to the container being heated which is in the desorb-part of the cycle results in the capacity of the invention to provide its extremely high coefficient of performance. If only about thirty percent of the energy is exchanged, the heating coefficient of the cycle increases from about 0.7 to above one and heating coefficient of performance is increased to above two. If sixty-five percent of the energy is recycled, the cooling coefficient of performance increases to two and the heating coefficient of performance increases to about three.

It is to be emphasized that since the system is cyclic and maximum efficiency is obtained by continuous recycling of the energy converters, the advantages of continuous operation suggest greater efficiency may be obtained in a typical heating system with the utilization of more than two energy converters whereby periodic complete shut-off of the system is avoided. Thus, although the system disclosed herein has only two energy converters, it will be understood by those skilled in the art that further converters may be added to the system in various arrangements.

The primary object of the instant invention is to provide a gas adsorption heat pump with significantly increased coefficient of performance in both its heating and cooling modes whereby it is economically competitive or better with electrically driven heat pumps.

Further objects, adaptabilities and capabilities of the invention will appear as the description progresses, reference being had to the accompanying drawings in which:

DESCRIPTION OF THE PREFERRED EMBODIMENTS

As indicated above, zeolites form a family of materials with a unique, open, cage-like crystal structure. Their atomic structure, oxygen, silicon, aluminum, together with an atom of the alkaline metals or earths has an arrangement whereby cavities interconnected by channels or tunnels are formed on an atomic scale. There are over thirty types of zeolites with cavity sizes ranging from three to over ten angstroms and connecting channels of various sizes.

Figure 1:
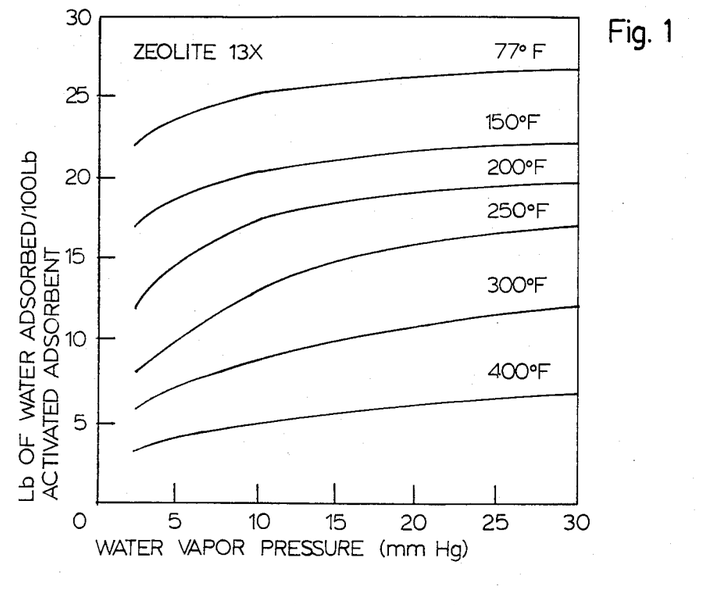
FIG. 1 is a diagram showing the amount of water adsorbed by a zeolite molecular sieve at various temperatures and absolute pressures of water vapor measured in millimeters of mercury.
Figure 2:
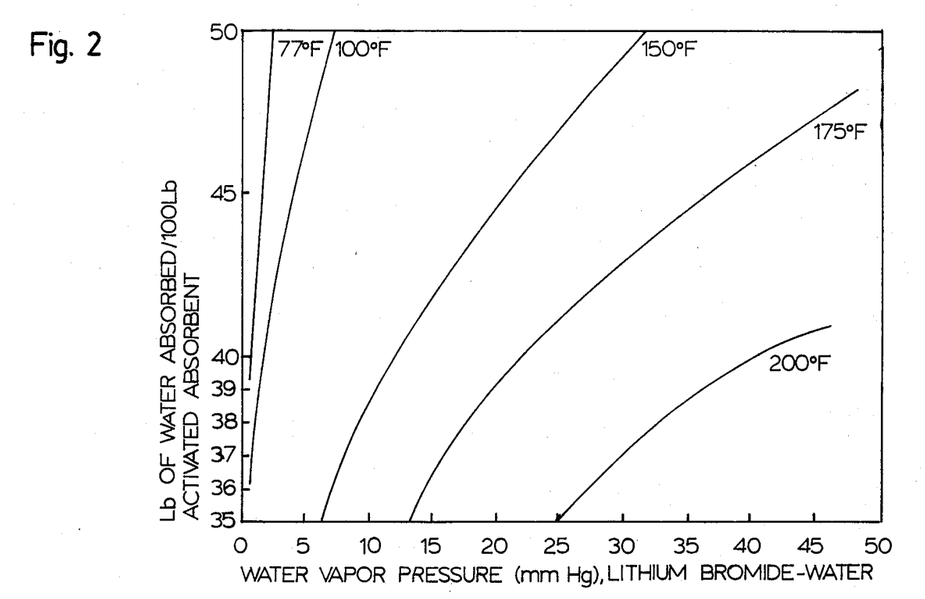
FIG. 2 is a diagram similar to FIG. 1 except it shows the amount of water absorbed by lithium bromide at various temperatures and absolute water vapor pressures measured in millimeters of mercury.

Because of this open porous structure, zeolites are capable of adsorbing large amounts of a variety of refrigerant gases ranging from water vapor, ammonia and carbon dioxide to different fluorocarbons, chlorocarbons and hydrocarbons at near room temperatures. Adsorption energy results primarily from the interaction of the polar moments of the gas molecules with the strong internal non-uniform electric fields which occur on the atomic level in the cage-like structure. The interaction is extremely nonlinear and exhibits saturation behavior in its pressure dependence. FIG. 1 presents the adsorption isotherms of water vapor of zeolites for a comparison with FIG. 2 which presents comparable adsorption isotherms for a lithium bromide water system. The non-linearity and saturation behavior of zeolites is obvious and at pressures above ten millimeters mercury, the adsorbed amount is almost independent of pressure and entirely dependent on temperature.

The solubility of ammonia in water, of water vapor in lithium bromide and the adsorption of refrigerant gases on surface adsorbents such as silica gel, activated alumina and activated carbon depend exponentially on $\Delta H/RT$ where $\Delta H$ is the energy of solution of adsorption and T is the absolute temperature. In other words, they obey the Arrhenius equation. Adsorption in zeolites, in contrast, are shown by Dubinin (M. M. Dubinin & V. A. Astakov, "Molecular Sieve Zeolites—II", American Chemical Society, Washington, D.C. 1971, pp. 69–85) to depend exponentially on at least the second and as high as the fifth power of $\Delta H/RT$. This extreme non-linearity of thermoactivation makes zeolites well suited for heat pump applications by reducing the influence of condensation pressure and temperature on the coefficient of performance of the cycle.

Figure 3:
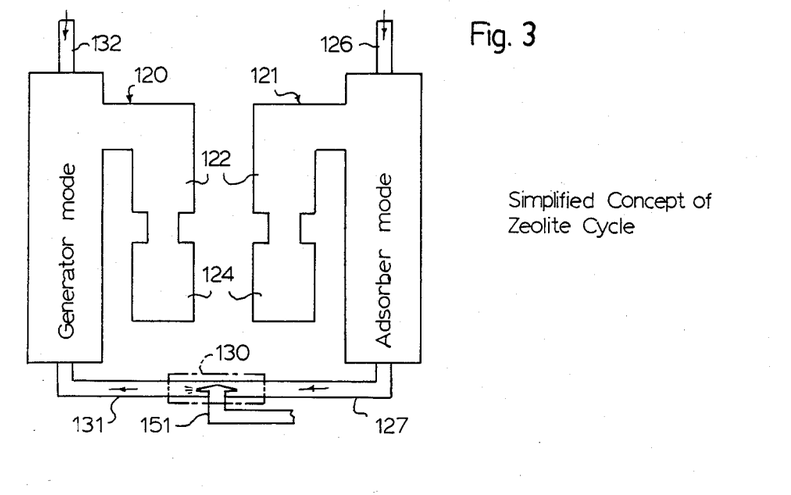
FIG. 3 illustrates schematically a simplified concept of the zeolite cycle in accordance with the instant invention.

The concept of the zeolite cycle of the instant invention is shown schematically in FIG. 3. The zeolite is divided into two separate hermetically sealed spaces, enclosures or containers of energy converters designated generally by reference numerals 120 and 121. Each space is provided with its own condenser 122 and its own evaporator 124.

In FIG. 3, converter 120 is in the generator mode whereas converter 121 is in the adsorber mode. Both converters 120 and 121 have extending vertically therethrough a plurality of fluid conduits 125 (See FIGS. 9 and 10). Such conduits are surrounded by zeolite adsorbent in a manner to be subsequently described. When combustion air enters from the outside, it is received by the conduits 125 and is preheated by the heat in the zeolite and structure of converter 121, such heat having been provided when converter 121 was in its previous generator mode. The zeolite and associated structure in converter 121 cool slowly and as the zeolite cools, it adsorbs refrigerant vapor from the converter's evaporator 124. The generated heat of adsorption plus the specific heat of the zeolite and associated structure in converter 121 increases the temperature of the outside combustion air to a temperature which is decreasing in time but remains above 100° F. Thus air enters and travels through conduits 125 from a flue conduit 126 and from the converter 121 through a bottom conduit 127. Air from conduit 127 passes through a heating station 130 which comprises a source of heat such as a burner 151 that provides gas flame to heat the air which is conveyed further through a further bottom conduit 131 of converter 120 and into its fluid conduit 125 wherein the heated air and gases of combustion heat the zeolite causing it to desorb. The gas combustion is controlled, as necessary, by means well known in the art to heat and maintain for the part of the cycle, the air and gases of combustion in conduit 131 at about 400° F. before it enters conduit 125 in converter 120. Here, the zeolite which has been cooled to about 95° F. during the previous cycle is heated to the temperature of about 400° F. As it is heated, the refrigerant gas is desorbed and pressure in the converter 120 increases so that the desorbed vapor can be condensed at a relatively high temperature (100° F.). The heat of condensation which takes place in the condenser 122 of converter 120 is rejected to the outside air or to a heat sink or is used, in part, for heating needs such as heating water during the cooling season. During the heating season, however, it is used to provide part of all of the heating load.

Figure 14:
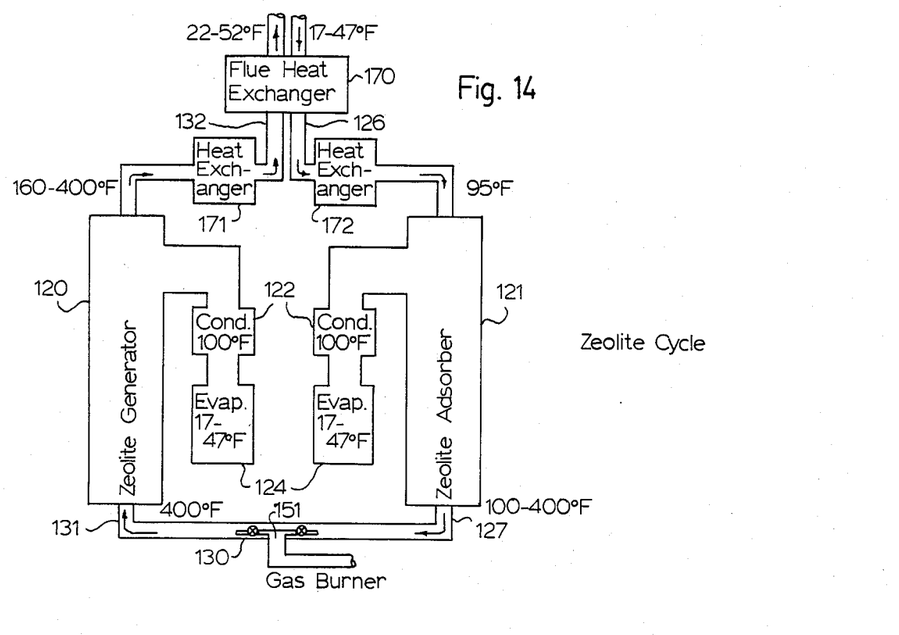
FIG. 14 is a schematic similar to FIG. 3 of a further zeolite cycle in accordance with the invention for the heating mode.

The combustion gases from converter 120 exit through the flue conduit 132 considerably cooled due to the heat exchange which takes place in converter 120. During the heating season, as indicated in FIG. 14, the gases may be further cooled by additional heat exchange means 172 to about 100° F.

After the above portion of the cycle is completed, the process is reversed. Outlet conduits 127 and 132 become inlet conduits whereas inlet conduits 126 and 131 become outlet conduits and the direction of air flow through the heating station 30 is reversed. Converter 120 becomes the adsorber and converter 121 becomes the generator of the refrigerant gas. The remainder of the cycle is repetition of its first part with the condensers 122 in converter 121 heating and the evaporator 124 in converter 120 cooling.

Figure 4:
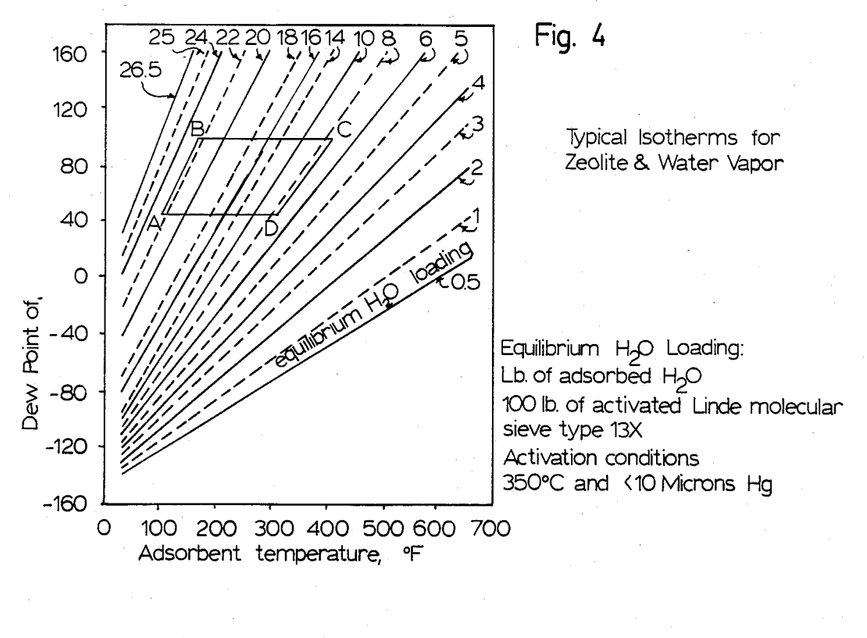
FIG. 4 is a diagram which discloses equilibrium loading of water as to pounds of adsorbed water in 100 pounds of activated zeolite molecular sieve, type Linde 13X, showing specifically the cycle of desorption and adsorption of water vapor in the instant invention.

FIG. 4 discloses typical adsorption isosteres for zeolite and water vapor. Isosteres are lines of constant loading of the refrigerant gas into the zeolite as a function of the zeolite's temperature and the refrigerant gases' dew point. At 100° F. zeolite temperature and 47° F. refrigerant temperature indicated by point A, the zeolite adsorbs about twenty-three percent of its weight in water vapor. The adsorption starts with the water vapor at about nine millimeters of mercury or less. The zeolite is next heated to 160° F. before it is possible for the vapor to start being condensed at a 100° F. condenser temperature. This is represesnted by point B. The gas pressure in the system is raised to about 50 millimeters of mercury or higher by the heating of the gas before it commences to condense. From 160° F. to 400° F. as represented by point C, the zeolite desorbs from twenty-three percent to eight percent, or a total of fifteen percent by weight, of its refrigerant vapor which is condensed at the 100° F. and the zeolite cools from 400° F. to 305° F. (point D) which reduces the pressure of the refrigerant gas in the converter to about nine millimeters of mercury or less and upon further cooling from 305° F. to 100° F., the latter represented by point A, the refrigerant gas is evaporated from the evaporator 124 at 47° F. and the zeolite in the converter adsorbs fifteen percent by weight of the refrigerant gas whereupon its percentage of water vapor by weight is increased from eight percent to twenty-three percent. The cycle is thus completed. From this diagram, it will be understood that heat exchange between converters, one in the generator mode and the other in the adsorber mode, takes place in the range of 160° F. to 305° F. at the minimum.

The specific heat of the zeolite given in BTUs per pound degree Fahrenheit varies from 0.3 and 0.1 depending upon the amount of vapor desorbed. The heat of adsorption varies from 1200 to 1500 BTUs per pound and the desorption rate is about 0.0625 percent for each degree Fahrenheit. This provides a desorption contribution so that the specific heat plus desorption remains almost constant and about one BTU per pound for each degree Fahrenheit of temperature change. Therefore at a constant rate of heat input, the rise in temperature with time without desorption, from 100° F. to 160° F. is over three times faster than when desorption is taking place from 160° F. to 400° F. Similarly, during the cooling part of the cycle, the cooling rate provides a constant heat loss of up to five times more rapid without adsorption being present from 400° F. to 305° F. than when the adsorption is occurring from 305° F. to 100° F.

Figure 5:
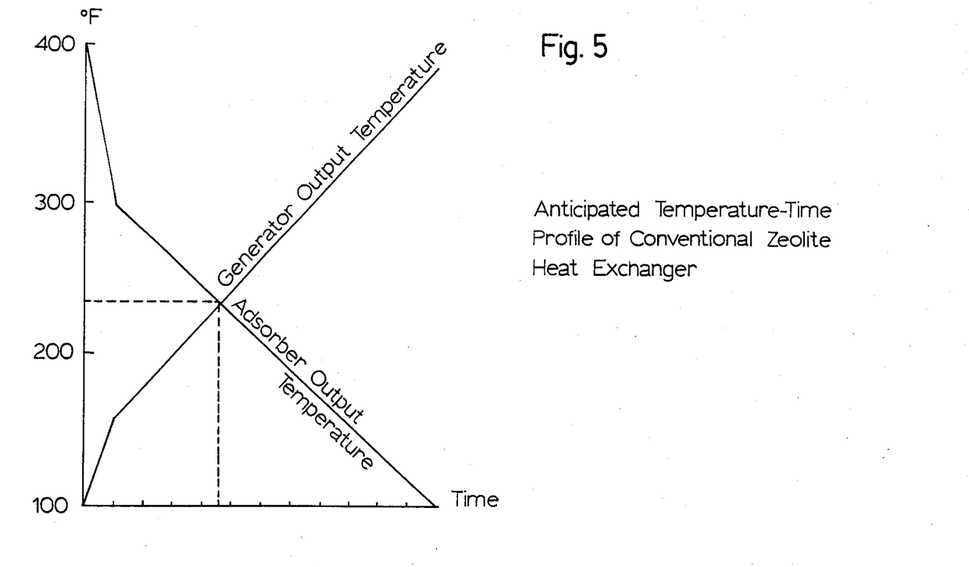
FIG. 5 is a diagram which illustrates the temperature-time profile of a conventional zeolite heat exchanger.
Figure 6:
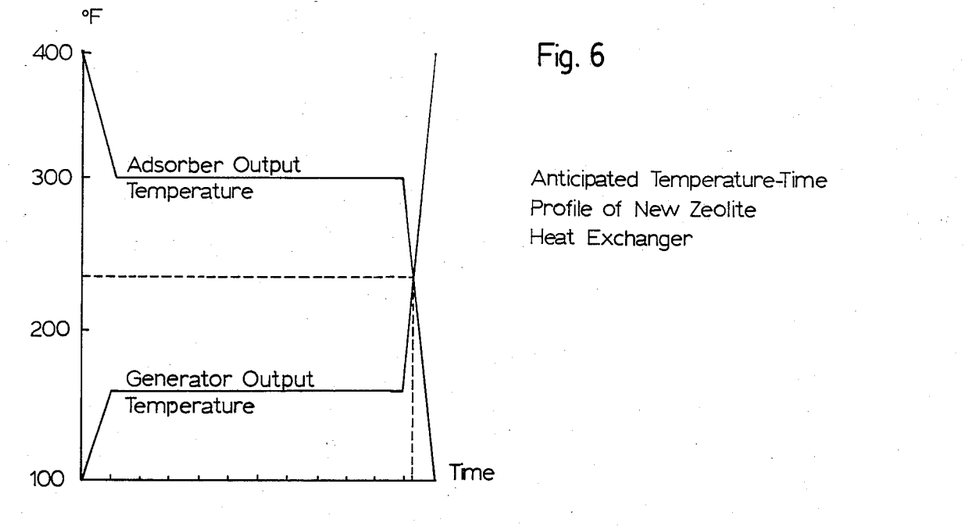
FIG. 6 is a further diagram which illustrates the temperature-time profile of the zeolite heat exchanger system in accordance with the instant invention.

FIG. 5 shows the theoretical temperature-time profile for the zeolite at the beginning of the zeolite containers in the generator and in the adsorber modes. Assuming all of the zeolite in the converters was at the same temperature and simultaneously followed the temperature profiles of FIG. 5, 37.5 percent of the adsorber energy is transferred from the converter in the adsorber mode to the generator before the two temperatures cross at about 240° F. Allowing for twenty percent irreversible losses in the heat exchanger, still a net energy transfer of over thirty percent is provided. Inasmuch as the coefficient of performance on this cycle in cooling without the energy transfer is about 0.7, a thirty percent reduction of input requirements increases the cooling coefficient of performance to one and the heating coefficient of performance to two. Because there is a time and temperature lag between the input and output of the actual zeolite container, the increase in coefficient of performance is, in fact, higher. Further, by propagating a heat front through the zeolite in the converter, the improvement is considerably enhanced. The theoretical temperatures for such system are illustrated in FIG. 6. However, the actual temperatures attained conform more nearly to those indicated in FIG. 16.

Figure 13:
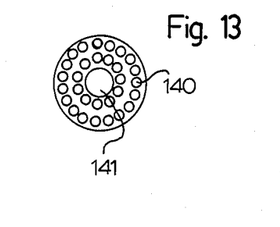
FIG. 13 is a top plan view of the packet shown in FIG. 12.

Referring to FIGS. 9 through 13, it will be seen converters 120 and 121 are placed in a single cylindrical container 134 which is suitably insulated and has an insulated divider 135. Fluid conduits 125 for the passage of air and combustion gases are intentionally formed from a thin metal of low thermal conductivity. Received on each conduit 125 is a tile or packet 136 comprising a thin layer of zeolite. Each packet 136 has the form of a flattened toroid only a few millimeters thick, which on its bottom is provided with a plurality of outwardly extending protrusions 137 or dimples and on its top side as shown in FIG. 13, a plurality of openings 140. The purpose of protrusions 137 or dimples is to provide spacing and resilience between individual packets 136. The hole 141 in packet 136 is dimensioned so as to fit tightly on conduit 125 to maximize thermal conduction between conduit 125 and the copper portion of packet 136 which contains a thin layer of zeolite, so heat which is delivered by the combustion gases and air travelling through conduit 125 is quickly conducted to the zeolite in packet 136 via the surrounding copper foil. For example, the packets 136 can be installed on conduits 125 after the latter have had their temperature reduced so that upon expanding, a tight fit is accomplished. If desired, conduits 125 can be threaded to provide alternating thin and thicker grooves along their outer peripheries which are received tightly by corresponding grooves on the interior periphery of packet 136 defining 141.

The purpose of the foregoing structure is to create a propagating temperature front in the zeolite along each of the conduits 125. Thus the heat exchanger which comprises conduits 125 in each converter 120 and 121 has a plurality of nesting and contacting packets 136 from top to bottom and its heat transfer coefficient from air and the combustion products is larger than its conductivity along the path of the air or combustion products, the thermal conductivity along the conduit 125 being relatively low. The conduit may be composed of a metal having a thermal conductivity of 0.05 to 0.1 measured in a quantity of heat in calories which is transmitted through a plate of the metal one centimeter thick across one square centimeter when the temperature difference is 1° C. The specific heat of the air is also small compared to the heat capacity of the zeolite augmented by desorption. As a result, a temperature front is created in the zeolite layer with the generated refrigerant gas being removed therefrom faster to the condenser 122 than the rate of generation. The temperature front moves slowly across the length of the conduit 125 whereby the bottom zeolite packets are desorbed first and the layers of packets 136 which have been desorbed moves upwardly in the direction of the heat flow in the generating converter 120 or 121. Similarly, in the adsorbing converter a front in adsorbing packets 136 will move, again in the direction of the air flow, downwardly. With such heat exchange, the output temperature profile and time for the converters when in the generator mode and the adsorber mode is shown in FIG. 6. In this manner, more than sixty percent of the thermal energy from the adsorber is exchanged through the generator and the coefficient of performance of the system approaches that of theoretical Carnot efficiency.

The solution to the heat diffusion equation for the metal-zeolite innerface and in the zeolite thereafter is represented by the following equation:

$$T(x,t) = T_o \text{erfc}(X/2 \sqrt{Kt})$$

Figure 7:
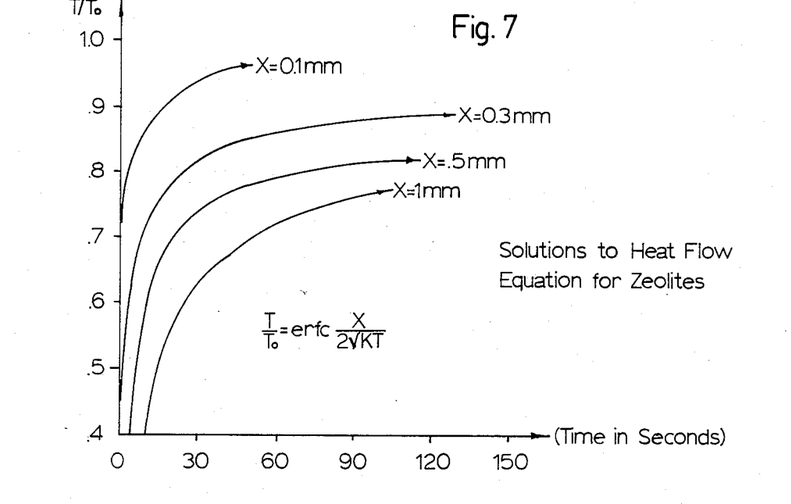
FIG. 7 is a graph which shows time duration solutions to the heat flow equation for zeolites of various thicknesses to obtain the profile shown in FIG. 6.

The coefficient K represents a number of physical constants such as the thermal conductivity of the zeolite, its specific heat and, above 160° F., the heat of desorption of the refrigerant gas. From FIG. 7, which represents the variation of zeolite temperature with time for different zeolite thicknesses, X=0.1 to 1 mm (4 to 40 mils.), it will be understood the upper limit of the zeolite layer's thickness is at most a few millimeters. By use of a low conductivity metal, ninety percent Copper, ten percent Nickel alloy, and wall thicknesses of less than five mils. the prerequisites for the creation and propagation of a temperature front as discussed above exists. This temperature front is not, of course, in practice a straight line or plane but rather involves the thickness of several packets.

Due to the non-linearity of the adsorption isotherms for zeolite, condenser temperatures may, if desired, be increased without causing a reduction in the capacity of the unit more than would exist were conventional adsorption or absorption systems utilized and, in fact, the reduction in capacity is less. Nevertheless, inasmuch as in the heating mode, there is a considerable amount of energy available in the converter in the adsorber mode at 160° F. and below, it is advantageous to keep the condenser at about 100° F. and use it to preheat the load fluid with a further increase in its temperature to above 160° F. by heat from the converter in the adsorber mode. When cooling, the condenser is cooled indirectly by ambient air or in a heat sink or the like, and the variation with air temperature of capacity is small.

Figure 9:
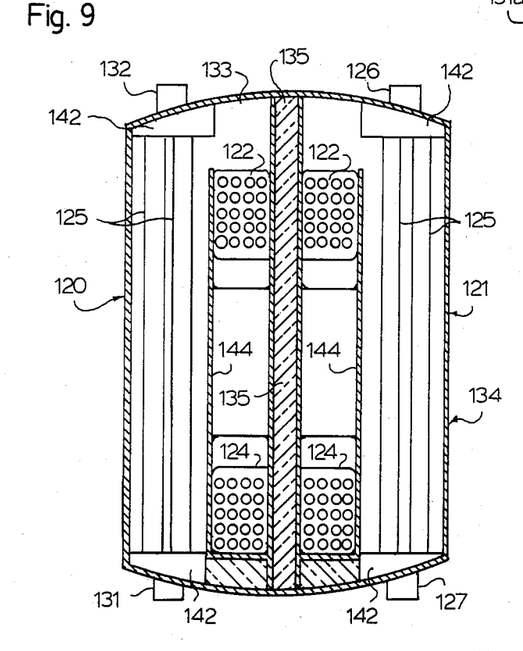
FIG. 9 illustrates an embodiment in a partial section elevational view wherein two energy converters are within a single pressure container.
Figure 10:
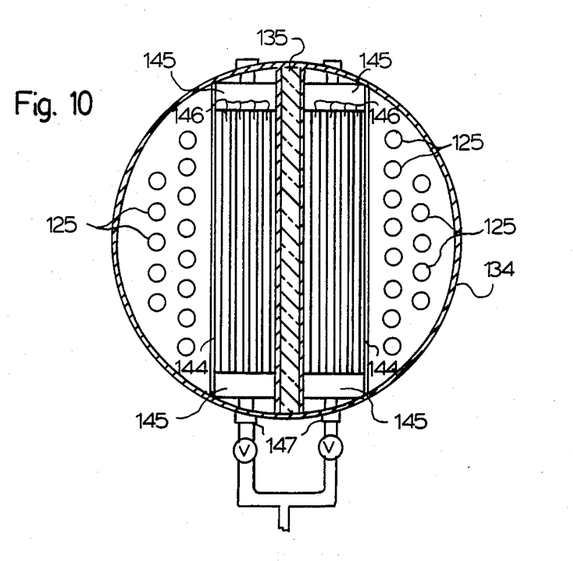
FIG. 10 is a sectional plan view of the container and energy converters shown in FIG. 9.
Figure 11:
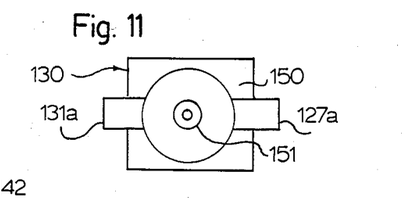
FIG. 11 illustrates diagramatically a gas burner which is employed with the container and energy converters shown in FIGS. 9 and 10.
Figure 12:
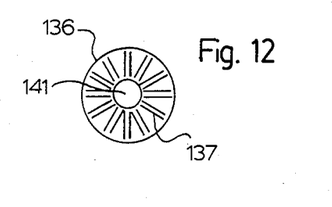
FIG. 12 is a bottom plan view of a packet or tile containing zeolite which is received by the fluid passageways for combustion and cooling gases in FIG. 9.

As previously indicated, specific embodiments for the invention can be varied considerably depending upon the heating and cooling demands which are placed on the system. An embodiment is shown in FIG. 9 wherein the converters are in a single unit which can be installed in an existing building and connected with an existing system in lieu of the furnaces or air conditioners already installed. The container 134 for the units 120 and 121 is essentially an insulated tank having a structural capacity for a high interior vacuum which, in an operation wherein the refrigerant is water, may be five millimeters of mercury or less.

Each container contains two energy converters 120 and 121, each energy converter having, in effect, three heat exchange means which comprise the fluid conduits 125, the condenser 122 and the evaporator 124. Although each heat exchange means is shown as having a single pass, it will be appreciated they may be double pass or more. Also the heat exchangers are shown as having straight tubes whereby, in practice, helical wound tubes may be utilized or plate type heat exchangers may be substituted. Further, as disclosed in my copending application Ser. No. 267,074 filed May 26, 1981, the disclosure of which is hereby incorporated by reference herein, the same heat exchanger may be utilized for both the condenser and evaporator. As a matter of practice, double pass heat exchangers are advantageous for the condenser and evaporator because they permit connections into container 134 conveniently only on one side. Further, although a divider 135 divides container 134 into two different hermetically sealed spaces 133 wherein the refrigerant is received it will be appreciated that the divider 135 may also be utilized to provide any number of such spaces which are pie shaped as seen in plan. Thus, a single container 134 may be used for three converters, four converters or, within structural limits, any number desired.

Figure 8:
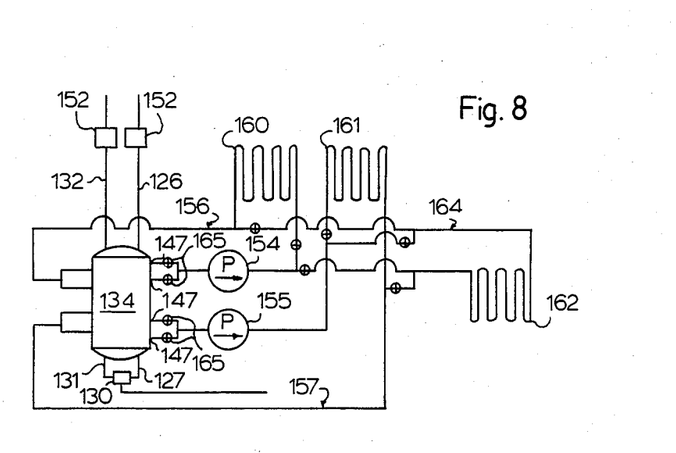
FIG. 8 is a schematic of energy converters in accordance with the instant invention incorporated into the heating and cooling system of a building.

When single pass units are involved, they may be inclined within container 134 as suggested by the disposition of parts in FIG. 8 so that if a pump is not operable to provide forced circulation of the cooling and heating water flowing through the condenser or evaporator, it can occur in any event due to natural circulation of the system. Otherwise, ice may form in the evaporator or steam may be generated in the condenser.

Flue and bottom conduits 126, 127, 131 and 132 for the air and combustion gases are each connected with their respective internal conduits 125 via an antrum 142. It will be understood such flue and bottom conduits and antrums together with the fluid conduits 125 are hermetically sealed from the space 133 within container 134 which contains the zeolite packets 136 and the refrigerant which, in the preferred embodiment, is water vapor. A barrier 144 is provided in each converter 120 and 121 to divide the zeolite and conduits 125 from the condenser 122 and evaporator 124. Such barrier has a pocket formed on each side thereof whereby the condensed water is received, the pocket surrounding the cooling water tubes 146 of evaporator 124. Each condenser and evaporator is provided with such heat exchange tubes 146 which connect on the inboard side of further antrums 145 which on their outboard sides are provided with connections 147 to receive heating or cooling water, as appropriate.

Separate from container 134 is a heating station 130 which is preferably an insulated box-shaped combustion chamber 150 into which is inserted heating means comprising a gas burner 151. As previously described, gas burner 151 can, if desired, be a fuel oil burner, an engine exhaust outlet or a heat exchanger from, for example, a solar heating unit or a geothermal fluid source. Station 130 has two outlets 131a and 127a for connection to bottom conduits 131 and 127 respectively as seen, for example in FIG. 3.

Burner 151 is provided with, of course, conventional safety devices including a pilot light and a solenoid cut-off valve in the event of failure of gas pressure whereby the pilot light is extinguished. Further, burner 151 may be utilized by being directed either towards outlet 131a or 127a to induce air movement through the air and combustion gases conduits. However preferably the direction of air movement is accomplished by energizing one of two electrically driven fans 152 which respectively connect with conduits 132 and 126. By this means, air is drawn through the fluid passageways and in the event any of the conduits for the air and combustion gases leak, then the leakage is from rather than into the area wherein the system is located. A single reversible fan may be utilized on either one of the conduits 132 and 126 in lieu of two fans 152. In this connection, it should be understood the flow of air whether caused by one fan or two fans is about thirty times that required to sustain combustion of fuel from gas burner 151. Thus the chances of such combustion posing a danger to the occupants of a building wherein the system is installed is practically nonexistent.

In FIG. 8 a simplified system for heating and cooling by means of the above described operation is shown. Circulating pumps 154 and 155 are employed in water conduit circuits 156 and 157 respectively.

Circuit 156 contains one or more heating elements 160 and circuit 157 contains one or more cooling elements 161. A thermal-dissipation element 162 is contained in a conduit circuit 164 which can be connected selectively to either circuit 156 or circuit 157 so that either part or all of the circulating water destined for either heat element 160 or cooling element 161 can be dissipated to the outside or to a heat sink or the like.

Valves 165 immediately after connections 147 in circuits 156 and 157 may be solenoid valves or pressure operated valves which are controlled by temperature sensors at conduits 126, 127, 131 and 132 or by pressure sensors internal to converters 120 and 121. Fans 152 are controlled by the controls for burner 151 and the particular fan to be running at any given part of the cycle is controlled by temperature sensors located in outlets 126, 127, 131 and 132 or alternatively by internal temperature or pressure sensors in converters 20 and 121.

Burner 151 may be controlled simply by a room thermostat which contains or is responsive to elements 160 and 161. It may also be connected to sensors at outlet 126, 127, 131 and 132 whereby, with the thermostat opened, the cycle is nevertheless continued until the adsorber output temperature crosses with the generator output temperature as shown in FIG. 6.

Sensors as indicated above may also be employed to dictate, when the system is started which fan will start first by detecting which converter has the highest temperature.

In operation, when converter 120 is heated, refrigerant gas is expelled from the zeolite therein and condensed by condenser 122 which thereby heats the water circulated by pump 154 in circuit 156. Fan 152 for conduit 132 draws air through passageways 125, such air being preheated at station 130 by burner 151. A heat front is created in the zeolite packets 136 starting at the bottom and working towards the top in successive packets which are received around the conduits 125 and when such front reaches its highest point whereby the zeolite in converter 120 has desorbed all but eight percent by weight of its water, the temperature in conduit 132 increases quickly to 400° F. thereby causing fan 152 in circuit 132 to cease operating and fan 152 in circuit 126 to commence drawing air into conduit 132 through conduits 125 in converter 120 and out of such converter via conduit 131 into combustion chamber 150. There it is heated by the flame from burner 151 and, as heated, continues through conduit 127 into passageways 125 of converter 121 and out of conduit 126. After passing through fan 152 it is exhausted the atmosphere. The same part of the cycle previously described for converter 120 now takes place in converter 121 and air being drawn through converter 120 cools the zeolite therein by a cold front which moves downwardly. The vapor condensed into water by condenser 122 commences to boil and is evaporated in evaporator 124 into space 133 because, as the temperature of the zeolite is lowered, it commences to adsorb water vapor and also because the pressure in converter 120 is lowered. This evaporation in evaporator 124 at the lower temperature takes place at about 9° C. or 47° F. However, the adsorption of the water vapor into the zeolite heats the zeolite by means of the heat of adsorption.

The heat of adsorption together with the heat source provided by the higher temperature of the zeolite and other internal structure heats the air passing through the conduits 125 while, at the same time, cooling the zeolite and other structure. A thermal front drops through the zeolite as previously described and the heated air is transferred via conduit 131 to combustion chamber 150 thus preheating and preserving the heat of adsorption as well as that due to the specific heat of other elements in the converter 120. The ultimate result is a much higher coefficient of performance than would otherwise be obtainable. During this part of the cycle, cooling water is caused by pump 155 to circulate through circuit 157 and such cooled water may be utilized for cooling purposes in the cooling season or for other cooling purposes (for example, cooling a food storage room) or dissipated as required. Because of the possibility that the temperature in the evaporator 124 may drop below freezing during the heating season, such water may have antifreeze or the like added thereto to ensure it is not frozen.

FIG. 14 is a diagram similar to FIG. 3 which is, however, a more complete representation of the zeolite gas-fired pump in the heating mode. In addition, an indication of typical temperature to be experienced during heating operations is set forth in FIG. 14. Combustion air enters from the outside into the conduit 126 at a temperature which in the heating season is typically between 17° F. and 47° F. This air is preheated by a flue-heat exchanger 170 to about 95° F. Such heat exchangers are well known in the art and therefore will not be described in detail. An example is the Dolin Heat Reclaimer manufactured by Stacor Corporation of Newark, N.J. Such air passes through a further heat exchanger 171 which, for the part of the cycle indicated in the Figure, is inactive. The combustion air continues into the converter 121, passing through the conduits 125. The generator 121 is in the adsorber phase and is being cooled from its prior generator phase during which it reaches 400° F. Converter 121 slowly cools and continuously adsorbs refrigerant vapor from its evaporator 125 at a temperature which is typically, again, between 17° F. and 47° F. The generated heat of adsorption plus the specific heat of the zeolite and other container structure heat the outside combustion air flowing through conduits 125 to between 100° F. and 400° F. With the air-to-zeolite heat exchanger comprising packets 136 stacked on conduits 125, the output temperature of the air and combustion gases is from conduits 125 maintained at about 400° F. for almost the entire adsorption part of the cycle.

By thermostatic or other appropriate well-known controls, the combustion air leaving converter 121 via conduit 127 is heated at heating station 130 to about 400° F. Such air is then conveyed by conduit 131 into the converter 120 wherein the zeolite is about 95° F. which it reached in its prior adsorber phase. Now with converter 120 in the generator phase, the temperature of the zeolite is increased via the propagating temperature front to about 400° F.

As soon as some of the zeolite in converter 120 is heated to above about 160° F., refrigerant gas is desorbed and the pressure is increased sufficient for the gas to condense at 100° F., the heat of condensation in the converter's condenser 122 being used to provide the heating load. Combustion gases leave converter 120 at about 160° F. at the beginning of the generation cycle, but their temperature increases rapidly to about 400° F. where it remains until the end of the cycle. During the heating season, these gases are cooled in heat exchanger 172 to about 100° F. Heat exchanger 172 may be utilized in conjunction with condenser 120 for the heating load or as a preheater for hot water and other heating purposes. It will, of course, be understood the entire heating load of the building may be furnished by the condenser 122 and heat exchanger 172 when converter 120 is in the generator phase. In a like manner, converter 121 may be used together with its condenser 122 and heat exchanger 171 to provide heat for the entire heating load of the building when it is in the generator phase. Thus, the fluid circulated through heat exchangers 171 and 172 which is heated for the purpose of the overall heating load is switched alternately between such heat exchangers in the same manner as accomplished for condensers 122 and evaporators 124. Finally, gases leaving heat exchanger 172 are further cooled in the flue-heat exchanger 170 and exhausted to the outside air in a temperature range which is typically in the range of 22° F. to 52° F. Heat carried away from the evaporators 124 is typically dissipated in element 162. It is not, however unusual for larger building to require both heating and air conditioning at the same time due to the location of the sun and other factors. Thus is it possible by using the instant invention with an appropriate plumbing arrangement both to heat and cool at the same installation.

After the described portion of the cycle is completed, the process is reversed and the direction of air flow through the heating station 130 is also reversed. The cycle is repeated as described above with condensers and evaporators also being interchanged.

The coefficient of performance of the heat pump described above and disclosed in FIG. 14 is theoretically about three for the heating mode where the evaporator temperature is 17° F. and the condenser temperature is 100° F. for a load of 160° F. In practice, of course, the coefficient of performance is less. But with proper design is nevertheless within about eighty percent of the theoretical value, that is, about 2.4.

The time of each cycle depends upon the size of the unit. With the proper design, in theory it could be short as two and one-half minutes. However, to ensure that the materials—particularly conduits 125—are sufficiently strong and durable, as a matter of practice, the cycling time is fifteen to thirty minutes. With the zeolite temperature range being from 100° F. to 400° F., it desorbs about fifteen percent by weight of water vapor and each pound of zeolite produces about 150 BTUs of cooling when the 0.15 pounds of water is condensed and evaporated during a cycle. Thus with fifteen minute cycling, 600 BTUs per hour of cooling are provided. For one ton of air conditioning, that is, 12,000 BTUs per hour, twenty pounds of zeolite are therefore necessary.

It is advantageous that the zeolite in packets 136 be composed of thin slices of natural deposit zeolite which are only a few millimeters thick. Each zeolite slice is then inserted into a corresponding packet 136 made of thin copper foil. When the surrounding packet 136 is then evacuated, the copper foil is brought into close contact with the zeolite slice to provide a good thermal conduction for the thermal cycling without a need for binders.

The end product, which is essentially the container 134 with the converters 120 and 121 installed together with the combustion chamber 150 and gas burner 151, is an adsorbent heat pump having a cooling coefficient of performance of between one and two and a heating coefficient of performance between two and three. The weight of the unit is somewhat less than eighty pounds for each ton of cooling and its price is competitive with or less than that of existing electrically driven heat pumps for each ton of cooling. For most areas, the operating costs are significantly less. Moreover, both in initial cost and in operating and maintenance costs, the unit is substantially less than the combination of electrical air conditioning and a gas furnace. This comparison is expected to continue even though an increase in gas prices may occur to the extent that the heating and cooling costs for a building will be reduced despite an increased gas prices. The system is particularly attractive for the central and northeastern parts of the United States where annual heating costs of over $1,000 are sufficient to justify the replacement of existing systems with a repayment period of about two years without considering tax credits.

It will be noted the system does not utilize inside air for combustion as is frequently the case with conventional gas furnaces. Although the circulation of air may occur or be provided by other means including diffusion and intentional circulation of interior air to the outside and vice versa, the inevitable loss due to the forced infusion of air which results from a conventional furnace is thus eliminated by the invention.

Figure 15:
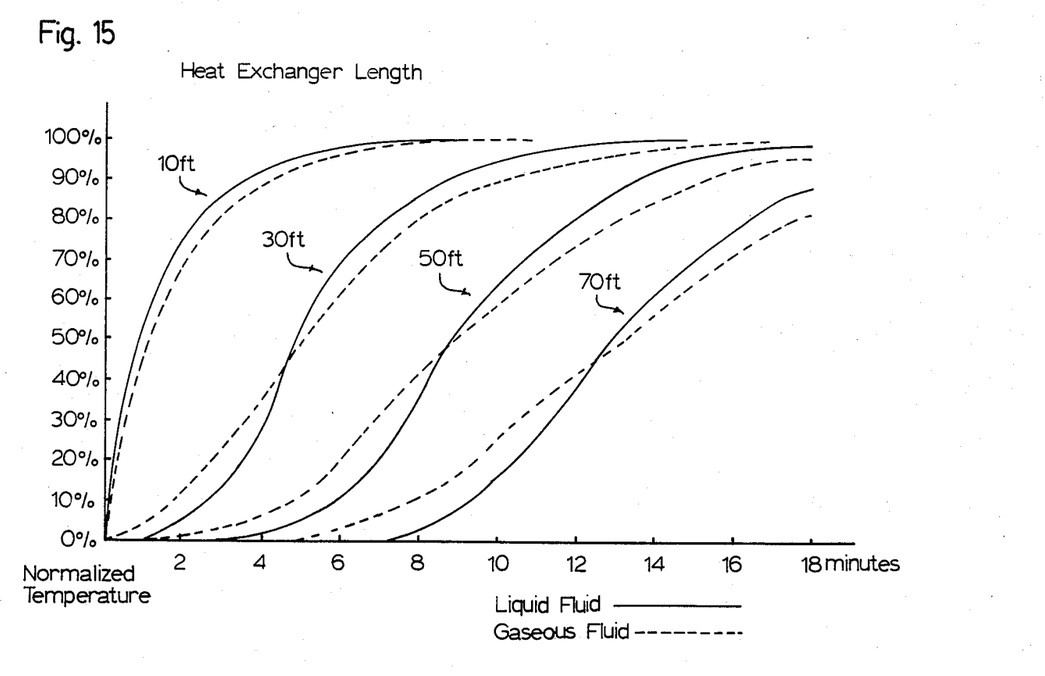
FIG. 15 shows the actual output temperature of a heat exchanger with time for different lengths of heat exchanger.
Figure 16:
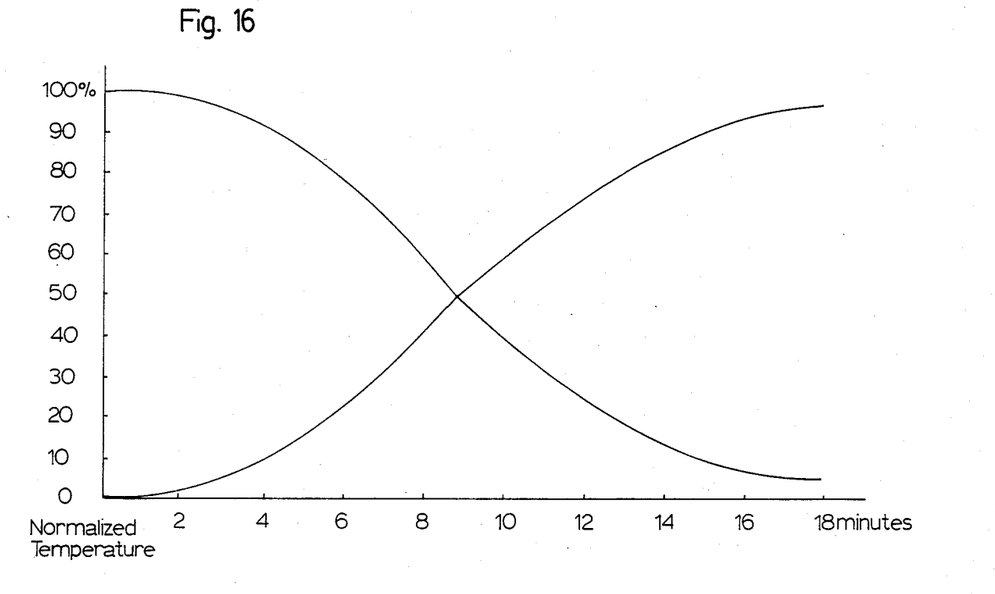
FIG. 16 is similar to FIGS. 5 and 6 showing actual performance wherein 70 percent energy is cycled between two containers.

In FIG. 15 various lengths of heat exchanger are compared to show the temperature increase which occurs for various effective lengths of the heat exchangers in terms of time. It will be noted that the shorter the heat exchanger, the more rapidly the temperature rises. FIG. 15 together with FIG. 16 are important for the purpose of showing the actual efficiency of energy recycled between the two containers. Thus FIG. 16 discloses the reduction of temperature in one of the containers while the temperature in the other container is increasing. FIG. 16 together with FIG. 15 indicate a seventy percent recycling of energy between the two containers. In such Figures, the normalized temperatures for gas were 100° F. and 400° F. for the gaseous fluids and 25° C. for the liquid fluid.

Figure 17:
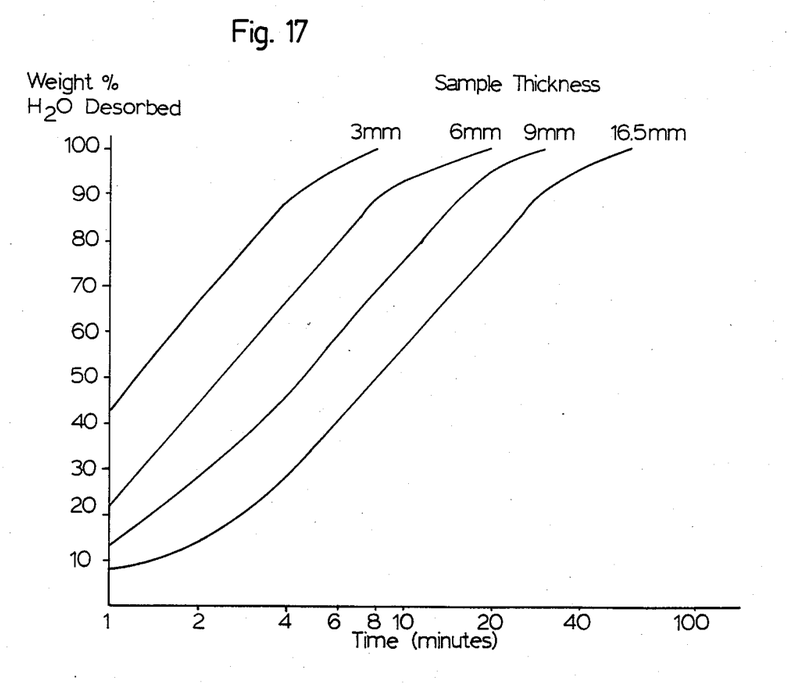
FIG. 17 is a graph showing measured performance of zeolite in desorbing water vapor for different thicknesses of zeolite.

FIG. 17 discloses the measured performance of different thicknesses of zeolite when immersed initially in a well-stirred liquid bath with a temperature differential of 100° C. Thicknesses ranging from three millimeters to 16.5 millimeters were tested. Such results indicate that a cycling time of three to four times per hour is not only feasible but also can be achieved with zeolite samples in thicknesses up to one-fourth inch thick or about six millimeters. However, it is important that the thermal flows into and from the zeolite be from both sides of the envelope so that the effective thermal path is reduced considerably.

Figure 18:
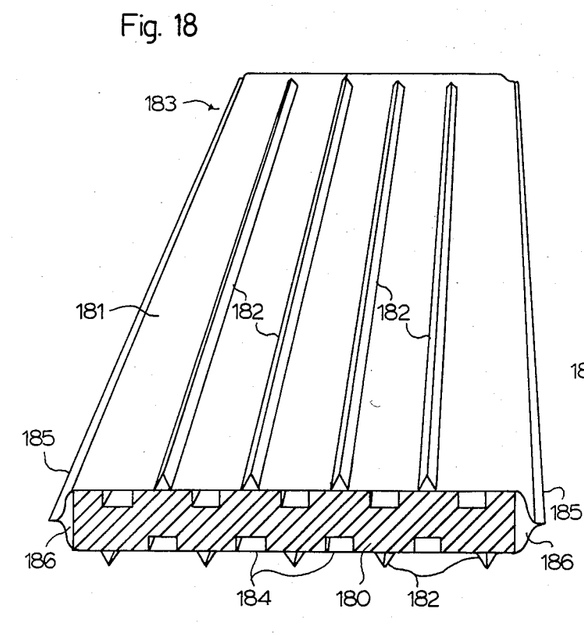
FIG. 18 is a perspective view in partial section showing zeolite bricks or tiles enclosed in a copper foil envelope as utilized to generate the data shown in FIG. 17.

A heat exchanger unit 183 found advantageous is shown in FIG. 18. This may be substituted for packets 136 and conduits 125 as shown in FIG. 9 with channels 182 and 184 being in fluid passage communication with the hermetically sealed space 133 through which condensers 122 and evaporators 124 flow. This is the type of envelope was utilized for the test which produced the results shown in FIG. 17. Zeolite bricks 180 are enclosed in a copper foil envelope 181 which includes a plurality of fins 182 which also form corrugated channels in the copper foil. The zeolite 180 also has a plurality of channels 184 and water vapor or other fluid flows readily through channels 182 and 184. Flue gases flow around foils 181. Foils 181 are sealed around their edges 185, such seal forming a further fin and on the inside a further channel 186.

Figure 19:
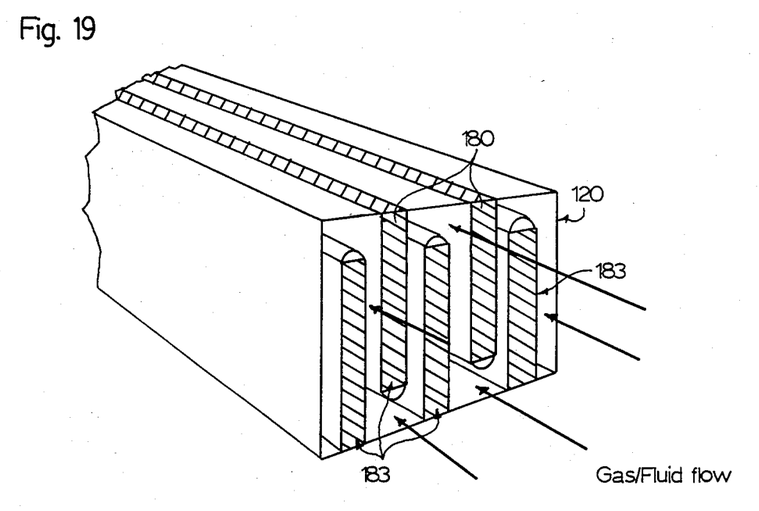
FIG. 19 illustrates the gas/fluid flow around a copper flow envelope as shown in FIG. 18 wherein the envelopes are in parallel.
Figure 20:
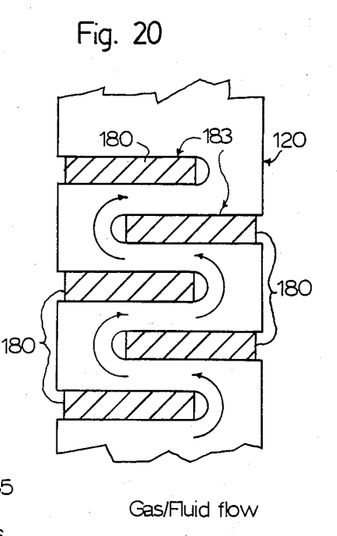
FIG. 20 is similar to FIG. 19 except that it discloses the zeolite envelopes in series for the gas/fluid flow.

The zeolite heat exchanger means 120 and 121 may thus be constructed of a number of units 183 either in parallel as illustrated in FIG. 19 or in series as illustrated in FIG. 20. The final configuration is determined by the size and capacity of the cooling unit. Typically, for one ton cooling capacity, twenty pounds of zeolite is cycled four times per hour between 100° F. and 400° F. and heat exchanger units 183 consist of three millimeter zeolite bricks 180 in thin copper envelopes. For maximum heat exchange effectiveness this produces a packing density of heat exchanger 120 of about 0.5 pounds of zeolite per square foot of heat exchanger. Therefore the total area of the heat exchanger is forty square feet which may be divided in the two containers 120. Air flow velocity for the gaseous heat transfer fluid is ten feet per second which provides a heat transfer coefficient to the copper envelope of 3 BTU/sq.ft/hr.°F. To increase this coefficient, as indicated, the copper foil is provided with corrugated channels 182 which act as fins to increase the surface area of the heat exchange and simultaneously to function as channels through which the water vapor travels.

As shown in FIG. 18, the zeolite brick 180 is provided with channels 184 for vapor travel. This, however, reduces the contact area between the zeolite and the copper and therefore the heat flow to a certain degree.

Zeolite bricks 180, as such, have been prepared by two separate methods. The first is by slicing natural zeolite rock with a carbide saw. A second method is by pressing powdered zeolite in a die. In the pressing, zeolite powder is slightly wetted with water and then pressed to the desired configuration at pressures of up to about one hundred, forty kilograms per square centimeter to produce a brick which dry has a density of about 0.8 grams per cubic centimeter. It has been found that these measures are required to produce high thermal conductivity and heat flow in the zeolite and therefore are important for a successful system. Zeolite bricks 180 are preferably not more than about ten millimeters in thickness.

Although the preferred embodiments of the invention has been described, it is to be understood that it is capable of other adaptations and modifications within the scope of the appended claims.

For example, instead of using heated air directly as a heat transfer fluid, a number of liquids such as silicon oils, glycols, and the like may be used as heat transfer fluids. As seen in FIG. 15, liquids provide sharper temperature fronts and therefore result in higher COPs. Furthermore, the energy to circulate a liquid is less than required for gases for the same amount of BTUs transferred, thus reducing parasitic electrical consumption.

Having thus described my invention, what I claim as new and to be secured by Letters Patent of the United States is:

1. An efficient system for heat utilization which comprises: a container defining an hermetically sealed space which contains heat exchange means, a refrigerant, an adsorbent material in thermal communication with said heat exchange means adapted to adsorb and desorb said refrigerant in response to temperature changes of said heat exchange means, condenser means for condensing said refrigerant and evaporator means for evaporating said refrigerant; said heat exchange means comprising conduit means extending through said container and defining a passageway therethrough hermetically separate from said space; circulation means operatively associated with said heat exchange means for selectively causing a first fluid to flow through said conduit means, said first fluid being sufficiently hot that said refrigerant is desorbed from said material, the pressure of vapor of said refrigerant in said space is increased, said vapor received by said condenser means is condensed into liquid and collected in said evaporator means and further selectively and successively causing a second fluid to flow through said conduit means, said second fluid being sufficiently cool that said refrigerant is readsorbed by said material from said evaporator means and pressure of said vapor in said space is lowered; and means for extracting energy from a third fluid which functions to cool or heat said condenser and said evaporator means respectively.

2. A system in accordance with claim 1 wherein said adsorbent is zeolite.

3. A system in accordance with claim 2 wherein said refrigerant is water.

4. A system in accordance with claim 2 wherein said second fluid after passing through said conduit means and having its temperature increased thereby is thereafter utilized as said first fluid and is heated by a low-grade heat source before being caused to flow through a further like heat exchange means in a further like container.

5. A system in accordance with claim 4 wherein said low-grade heat source is a mixture of air and combustion products.

6. A system in accordance with claim 4 wherein said low-grade heat source is waste heat.

7. A system in accordance with claim 4 wherein said low-grade heat source is solar energy.

8. A system in accordance with claim 2 wherein said material is in an immediate thermal conduction arrangement with said conduit means and such components perform the function of causing a temperature front to be propagated through said material in the direction of movement of said first and second fluids when flowing therethrough.

9. Apparatus which receives its energy from a low-grade heat source and provides heating and cooling for the interior of a building, said apparatus being operable to execute an intermittent adsorption heat pump cycle, said apparatus comprising:
  1. two hermetically sealed spaces, each space defined by:
    (a) a first chamber containing an adsorbent material and a refrigerant, said first chamber being in thermal communication with a first heat exchanger operative in a desorption mode to exchange heat with said low-grade heat source and in an adsorption mode to exchange heat with air from the atmosphere;

(b) a second chamber for condensing and vaporizing said refrigerant, said second chamber being in thermal communication with a second heat exchanger operative to exchange heat with said interior selectively to heat or cool same; and 2. conduit means for conveying said fluid which has been heated in said adsorption mode in one said space to be further heated by said low-grade heat source and received by said first heat exchange in said other space to heat said adsorbent in its desorption mode.

10. Apparatus in accordance with claim 9 wherein said adsorbent material is zeolite.

11. Apparatus in accordance with claim 10 wherein said refrigerant is water.

12. Apparatus in accordance with claim 11 wherein said low-grade heat source is a gas flame.

13. Apparatus in accordance with claim 10 wherein the longitudinal thermal conduction of said heat exchangers is relatively low and their thermal communication with said material is sufficiently efficient so that the temperature front is propagated through said heat exchanger when said fluid is conveyed therethrough by said conduit means.

14. Apparatus in accordance with claim 13 wherein said heat exchangers are composed of an alloy metal having a thermal conductivity in quantity of heat in calories transmitted per second through a plate one centimeter across in an area of one square centimeter with a temperature difference of 1° C. which is not more than about 0.10.

15. Apparatus in accordance with claim 14 wherein said heat exchangers comprise tubes having a thickness of about one millimeter or less.

16. Apparatus in accordance with claim 15 wherein said material comprises sliced natural zeolite having thicknesses of not more than ten millimeters.

17. A process for heating and cooling an interior space by using a low-grade heat source, the process comprising the steps of:

1. providing first and second pressure tight enclosures, each enclosure having a working refrigerant, an adsorbent material, a condenser and an evaporator therein, said adsorbent material being in thermal communication with a conduit which is provided for its respective enclosure, said adsorbent material being capable of adsorbing said refrigerant exothermically;

2. providing a low-grade heat source and means for it to be alternatively in thermal communication with said conduit for each said enclosure;

3. raising the vapor pressure of said refrigerant in said first enclosure and desorbing the refrigerant from said adsorbent material using said low-grade heat source;

4. allowing refrigerant vapor in said first enclosure to be received by said condenser therein, condensing said refrigerant vapor, and transferring said refrigerant's heat of condensation to said internal space or to the atmosphere;

5. lowering the vapor pressure of said refrigerant in said second enclosure by adsorbing said refrigerant by said adsorbent, and transferring the heat of adsorption thereby generated to said first enclosure via said conduits; and 6. repeating steps 3, 4 and 5 in the opposite of said enclosures.

18. A process in accordance with claim 17 wherein said adsorbent material is zeolite.

19. A process in accordance with claim 18 wherein said working refrigerant is water.

20. A process in accordance with claim 18 wherein said low-grade heat source is a gas flame.

21. A process in accordance with claim 20 wherein said vapor pressure in step 3 is increased to about fifty millimeters of mercury.

22. A process in accordance with claim 21 wherein said refrigerant vapor in step 4 is condensed by said condenser at a temperature of about 100° F.

23. A process in accordance with claim 22 wherein said vapor pressure in step 5 is reduced to at least ten millimeters of mercury.

24. Apparatus for exchanging heat between a fluid and a solid adsorbent which comprises a conduit for said fluid which is composed of metal having a thermal conductivity measured in quantity of heat in calories which is transmitted per second through a plate one centimeter thick across an area one square centimeter when the temperature difference is 1° C. which is in the range of about 0.05 to 0.1, said conduit having an effective thickness of about 0.5 millimeters or less, the thermal conductivity of said solid adsorbent being substantially less than said conduit, said solid adsorbent mounted on said conduit in immediate thermal communication therewith and having a thickness of not more than about ten millimeters, said conduit and said solid adsorbent thereon being so arranged that a heat transfer takes place between a fluid flowing in said conduit and said solid adsorbent wherein said fluid and said solid adsorbent have different initial temperatures along a temperature front which moves along said solid adsorbed in the direction of said fluid's movement, the temperature of said solid behind said front being about the same as said fluid behind said front and remaining at about its initial temperature forward of said front.

25. Apparatus in accordance with claim 24 wherein said solid absorbent is zeolite.

26. Apparatus in accordance with claim 25 wherein said initial temperature is about 100° F.

27. Apparatus in accordance with claim 26 wherein said temperature of said zeolite at said front is about 300° F.

28. Apparatus in accordance with claim 27 wherein said fluid is substantially air at substantially atmospheric pressure.

29. A system in accordance with claim 2 wherein said refrigerant comprises a polar fluid.

30. A system in accordance with claim 2 wherein said refrigerant is $H_2O$, $NH_3$, $CO_2$, a fluorocarbon, a chlorocarbon or a hydrocarbon.

31. A system in accordance with claim 2 wherein said low-grade heat source is a gas flame.

32. A system in accordance with claim 2 wherein said adsorbent comprises natural zeolite having a thickness of not more than about ten millimeters.

33. Apparatus in accordance with claim 10 wherein said refrigerant comprises a polar fluid.

34. Apparatus in accordance with claim 10 wherein said refrigerant is $H_2O$, $NH_3$, $CO_2$, a fluorocarbon, a chlorocarbon or a hydrocarbon.

35. Apparatus in accordance with claim 10 wherein said low-grade heat source comprises gases of combustion.

36. Apparatus in accordance with claim 10 wherein said adsorbent comprises natural zeolite.

37. A process in accordance with claim 18 wherein said refrigerant comprises a polar fluid.

38. A process in accordance with claim 18 wherein said refrigerant is $H_2O$, $NH_3$, $CO_2$, a fluorocarbon, a chlorocarbon or a hydrocarbon.

39. A process in accordance with claim 18 wherein said low-grade heat source comprises gases of combustion.

40. A process in accordance with claim 18 wherein said adsorbent comprises natural zeolite.

41. Apparatus in accordance with claim 25 wherein said fluid comprises a polar fluid.

42. Apparatus in accordance with claim 41 wherein said fluid is $H_2O$, $NH_3$, $CO_2$, a fluorocarbon, a chlorocarbon or a hydrocarbon.

43. Apparatus in accordance with claim 24 wherein said solid adsorbent comprises natural zeolite.

* * * * *